(12) United States Patent
Kazemzadeh

(10) Patent No.: US 12,576,562 B2
(45) Date of Patent: Mar. 17, 2026

(54) LONG-TERM STORAGE AND PROPORTIONAL DISPENSING DEVICE

(71) Applicant: Amin Kazemzadeh, Duluth, GA (US)

(72) Inventor: Amin Kazemzadeh, Duluth, GA (US)

( * ) Notice: Subject to any disclaimer, the term of this patent is extended or adjusted under 35 U.S.C. 154(b) by 511 days.

(21) Appl. No.: 16/085,982

(22) PCT Filed: Mar. 17, 2017

(86) PCT No.: PCT/US2017/022956
§ 371 (c)(1),
(2) Date: Sep. 17, 2018

(87) PCT Pub. No.: WO2017/161259
PCT Pub. Date: Sep. 21, 2017

(65) Prior Publication Data
US 2020/0330982 A1    Oct. 22, 2020

Related U.S. Application Data

(60) Provisional application No. 62/415,700, filed on Nov. 1, 2016, provisional application No. 62/309,811, filed on Mar. 17, 2016.

(51) Int. Cl.
*B01L 3/00*      (2006.01)
*B01L 3/02*      (2006.01)
(Continued)

(52) U.S. Cl.
CPC ............ *B29C 33/38* (2013.01); *B01L 3/0268* (2013.01); *B01L 3/50273* (2013.01);
(Continued)

(58) Field of Classification Search
CPC ............... B01L 3/50273; B01L 3/0268; B01L 3/502753; B01L 3/502738;
(Continued)

(56)        References Cited

U.S. PATENT DOCUMENTS 3,693,804 A * 9/1972 Grover ................... B01D 33/01
                                                       422/918
3,957,654 A * 5/1976 Ayres .................. B01L 3/50215
                                                       422/918
(Continued)

FOREIGN PATENT DOCUMENTS

GB          1078958 B1      8/1967
WO        96/33001 A1      10/1996
(Continued)

OTHER PUBLICATIONS

Amin, S., & Amin, M. (2011). Thermoplastic Elastomeric (TPE) Materials and Their Use In Outdoor Electrical Insulation. Rev. Adv. Mater. Sci. 29(2011) 15-30 (Year: 2011).*
(Continued)

*Primary Examiner* — Elizabeth A Robinson
*Assistant Examiner* — Sophia Y Lyle
(74) *Attorney, Agent, or Firm* — F. Brent Nix, Esq.; Johnson, Marcou, Isaacs & Nix, LLC

(57)        ABSTRACT

Embodiments disclosed herein provide microfluidic device components that may be used independently as valves, pumps, filters or as storage containers (flasks) with integrated valve and pump mechanisms. The components described herein may be integrated into multiple microfluidic device designs, including centrifugal and non-centrifugal microfluidic devices ("linear microfluidic devices"). The components may be used to store and/or dispense and/or move various reagents that may be employed on a microfluidic device to carry out any of a number of chemical and biological reactions and assays that may be done on such devices.

23 Claims, 11 Drawing Sheets

(51) Int. Cl.
*B29C 33/38* (2006.01)
*F04B 43/04* (2006.01)

(52) U.S. Cl.
CPC ... *B01L 3/502738* (2013.01); *B01L 3/502753* (2013.01); *F04B 43/043* (2013.01); *B01L 2200/16* (2013.01); *B01L 2300/0681* (2013.01); *B01L 2300/0809* (2013.01); *B01L 2300/0832* (2013.01); *B01L 2300/123* (2013.01); *B01L 2300/168* (2013.01); *B01L 2400/0409* (2013.01); *B01L 2400/0487* (2013.01); *B01L 2400/06* (2013.01)

(58) Field of Classification Search
CPC ..... B01L 2400/0487; B01L 2300/0809; B01L 2400/0409; B01L 2400/06; B01L 2300/123; B01L 2300/0832; B01L 2200/16; B01L 2300/0681; B01L 2300/168; B01L 3/502707; B01L 3/505; B01L 3/56; B01L 3/53; B65D 25/14; B65D 25/16; B65D 25/18; B65D 35/14; B65D 35/20; B65D 35/22; B65D 81/325; B65D 81/3255; B65D 1/40

See application file for complete search history.

(56) References Cited

U.S. PATENT DOCUMENTS

| | | | | |
|---|---|---|---|---|
| 4,417,981 | A * | 11/1983 | Nugent | B01L 3/50215 |
| | | | | 422/918 |
| 4,613,643 | A * | 9/1986 | Nakamura | C08L 23/02 |
| | | | | 264/DIG. 47 |
| 6,162,400 | A * | 12/2000 | Schembri | B01L 3/502 |
| | | | | 422/505 |
| 6,516,953 | B1 * | 2/2003 | DiCesare | A61B 5/150221 |
| | | | | 210/516 |
| 7,584,907 | B2 | 9/2009 | Contadini et al. | |
| 8,524,174 | B2 * | 9/2013 | Yobas | F04B 43/043 |
| | | | | 422/554 |
| 2004/0238052 | A1 * | 12/2004 | Karp | B01F 15/0205 |
| | | | | 137/822 |
| 2008/0003142 | A1 | 1/2008 | Link et al. | |
| 2008/0023414 | A1 * | 1/2008 | Konrad | G01N 33/491 |
| | | | | 210/789 |
| 2008/0085218 | A1 * | 4/2008 | Short | G01N 1/2205 |
| | | | | 422/88 |
| 2008/0142157 | A1 | 6/2008 | Maltezos et al. | |
| 2010/0196908 | A1 * | 8/2010 | Opalsky | G01N 21/03 |
| | | | | 435/6.1 |
| 2012/0009619 | A1 | 1/2012 | Gilbert et al. | |
| 2012/0085644 | A1 | 4/2012 | Renzi et al. | |
| 2012/0149603 | A1 | 6/2012 | Cooney et al. | |
| 2012/0216901 | A1 * | 8/2012 | Dickinson | F16L 55/1715 |
| | | | | 138/99 |
| 2013/0118900 | A1 * | 5/2013 | Reimitz | G01N 27/44782 |
| | | | | 204/600 |
| 2014/0102568 | A1 | 4/2014 | Servin | |
| 2014/0242721 | A1 | 8/2014 | Kellogg et al. | |
| 2015/0148255 | A1 * | 5/2015 | U'ren | B01L 3/502 |
| | | | | 536/25.4 |
| 2015/0190802 | A1 * | 7/2015 | Oppenheimer | B01L 3/502715 |
| | | | | 435/5 |

FOREIGN PATENT DOCUMENTS

| | | | | |
|---|---|---|---|---|
| WO | WO-2006055993 A1 * | 6/2006 | .......... | B01L 3/50215 |
| WO | WO 2013/046417 A1 | 4/2013 | | |
| WO | WO-2013084140 A1 * | 6/2013 | .......... | B01L 3/50273 |
| WO | WO-2014035471 A1 * | 3/2014 | .............. | A61M 1/36 |

OTHER PUBLICATIONS

Definition of "aperture" from dictionary.com, retrieved using WayBack Machine https://web.archive.org/web/20201030194333/https://www.dictionary.com/browse/aperture (Year: 2020).*

Properties of Dow Engage Polyolefin Elastomer from matweb.com, retrieved using WayBack Machine https://www.matweb.com/search/datasheettext.aspx?matguid=391c9c01a26c45d397e158ecfec445b6 (Year: 2015).*

International Search Report and Written Opinion of the International Searching Authority issued by the U.S. Patent and Trademark Office on Jul. 19, 2017 for PCT/US2017/022956.

Partial European Supplementary Search Report of corresponding application No. 17767626.9 mailed Jul. 11, 2019, all enclosed pages cited.

European Search Report and Written Opinion of corresponding application No. 17767626.9 mailed Oct. 22, 2019, all enclosed pages cited.

Search Report from corresponding European application No. 23177799.6 mailed Mar. 19, 2024, all enclosed pages cited.

Extended Search Report and Written Opinion of corresponding European application No. 23177799.6 mailed Jul. 24, 2024, all enclosed pages cited.

* cited by examiner

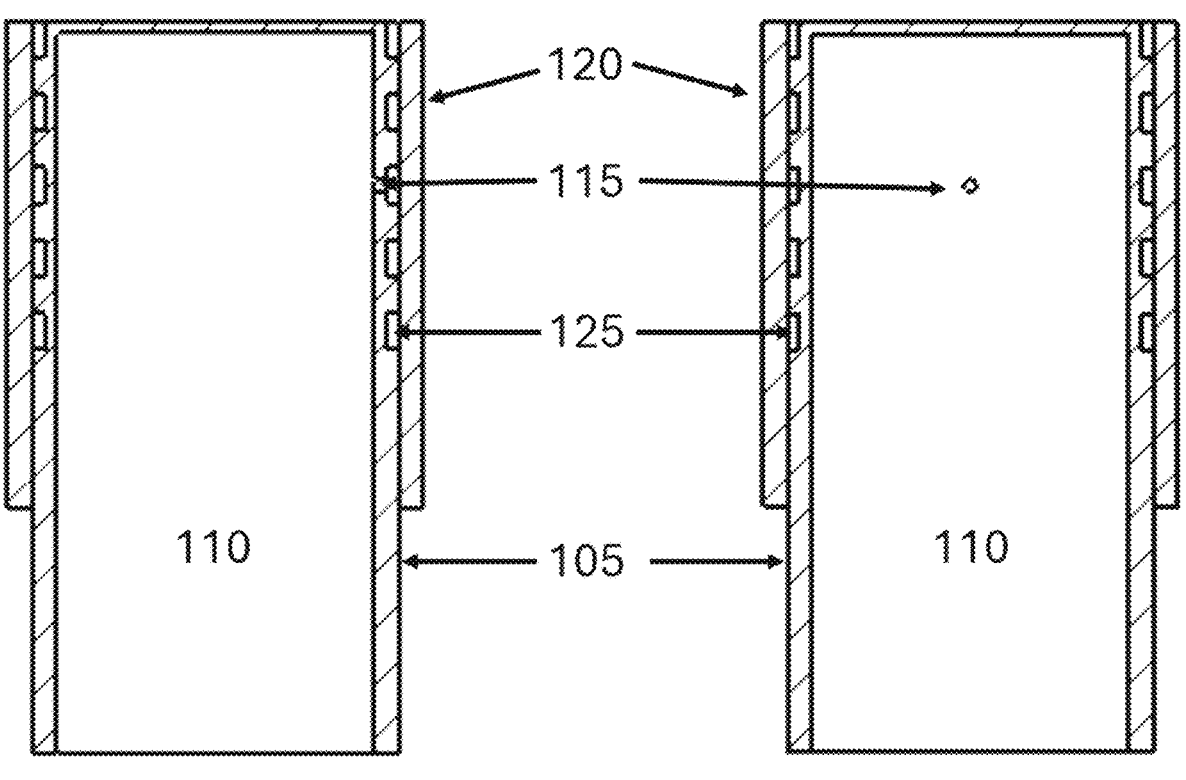
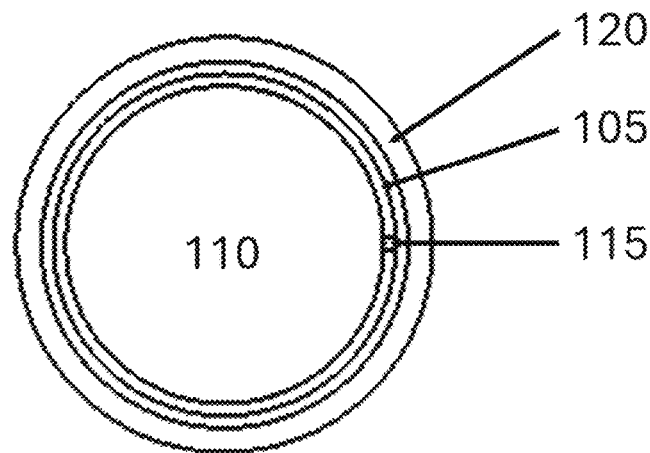
FIG. 5

O ring type smart flask
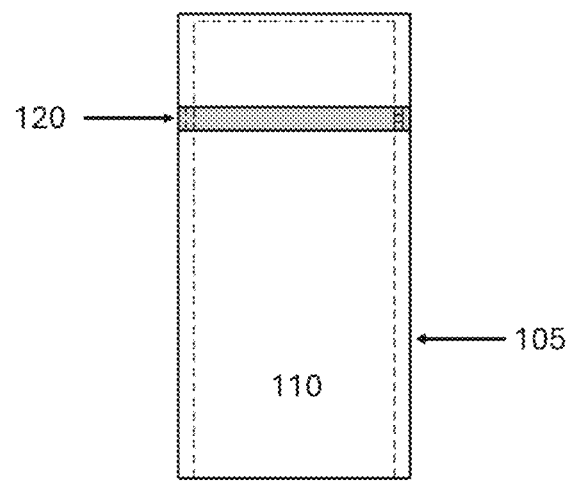
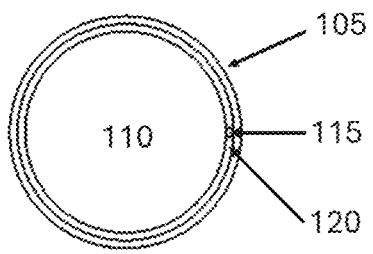
Container (rigid or elastic)          Elastic ring
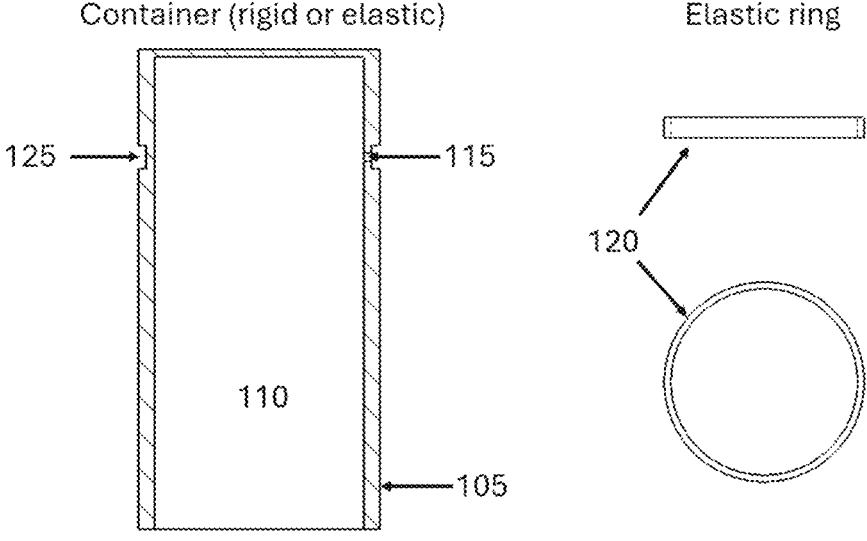
FIG. 6

All Dimension are determined according to:
a) The limitation in space of the main Lab on Chip device
b) Flow rate in demand
c) Desired spinning speed of the disc / desired applied pressure
d) Number of grooved on the container varies depending on the test requirement

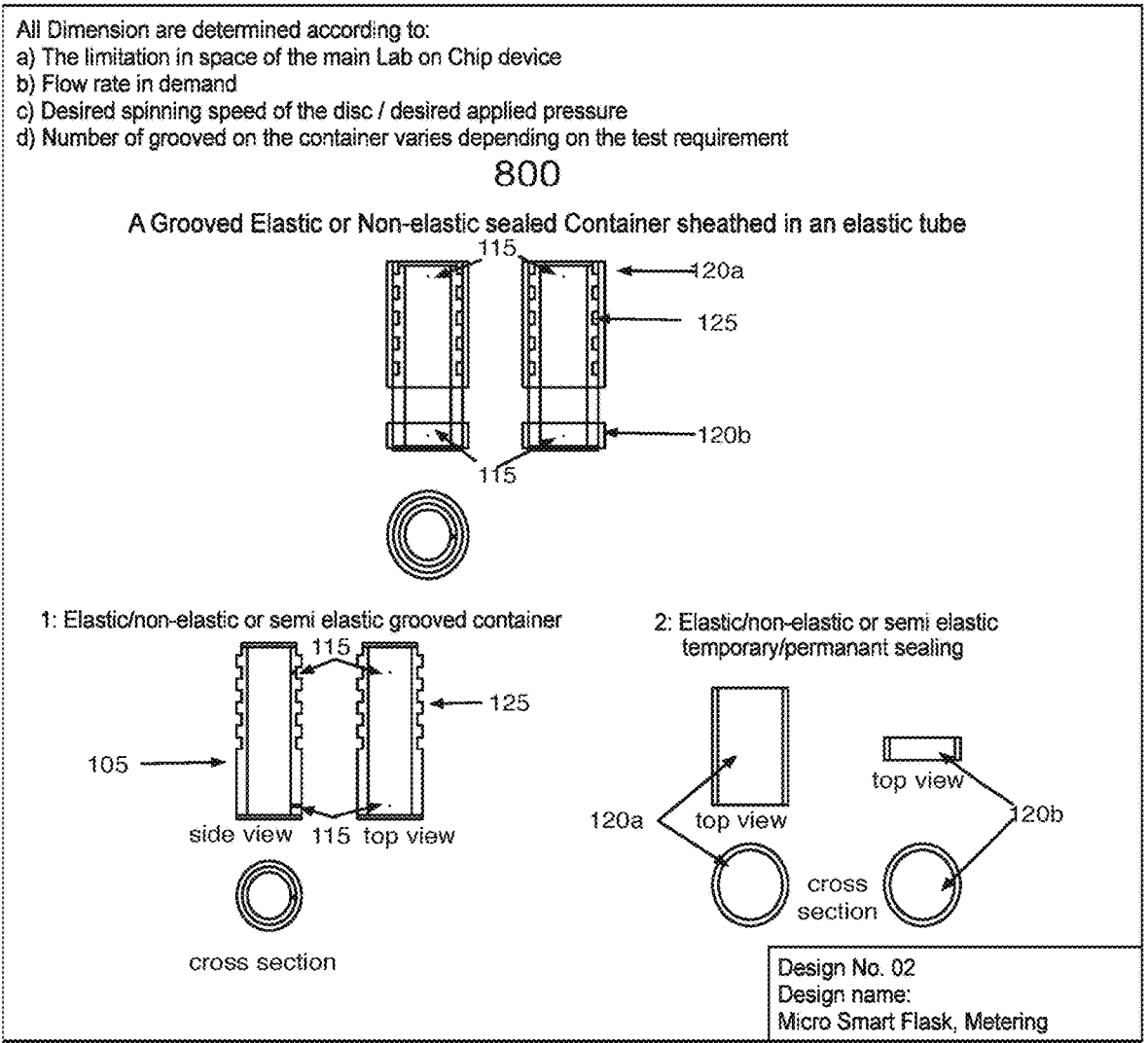

800

A Grooved Elastic or Non-elastic sealed Container sheathed in an elastic tube

1: Elastic/non-elastic or semi elastic grooved container

2: Elastic/non-elastic or semi elastic temporary/permanant sealing

Design No. 02
Design name:
Micro Smart Flask, Metering

FIG. 8

All Dimension can be defined freely and are determined according to:
a) The limitation in space of the main Lab on Chip device
b) The objective flow rate
c) The objective spinning speed of the disc or applied pressure

900

O ring type smart flask

120

105

Container (rigid or elastic)

125a — 115

105

125b — 115

Elastic/non elastic sealing

120

Design No. 03
Design name:
Micro Smart Flask, O-ring type

1000

LONG-TERM STORAGE AND PROPORTIONAL DISPENSING DEVICE

TECHNICAL FIELD

The subject matter disclosed herein is generally directed to microfluidic device components. More specifically, to microfluidic device components that can function as valves, pumps, and/or storage compartments for onboard storage and metered release of reagents on a microfluidic device.

BACKGROUND

"A successful microfluidic diagnostic technology will be self-calibrating, carrying all necessary reagents to run positive and negative controls along with it."[1] In microfluidics, reagents are so far dispensed by tedious manual pipetting or automated but expensive and immobile systems. Therefore, on-board pre-storage of reagents is indispensable to the automation of clinical tasks and accelerates the commercialization of Lab On Chip (LOC) systems. A variety of microfluidics operations e.g., switching[2-4], mixing[5, 6], metering [5, 7], etc., with the least amount of human intervention can be performed by implementing a reproducible, robust and reliable on-board pre-storage system. However, perhaps due to the challenge included, the majority of researchers have disregarded the on-board storage of reagents on LOC systems. The nature of reagents used in these systems include a wide range of dried to substances of high wettability (a comprehensive list of reagents is found in[8]).

In general, pre-stored reagents require compartments (i.e., directly embedded) or containers (i.e., separately placed) into LOC systems that are able to enclose the reagents and release them on call. There are also other complex, rather expensive and therefore less favorable mechanisms such as using pipetting robots, and mounting rotatable containers on centrifugal microfluidics[9, 10].

While offering simplicity and ease of fabrication, the use of compartment embedded in the systems require a hermetic sealing. In this regard, the phase change valves are reliable but not resealable valves which, require external power sources to actuate e.g., fast-actuated paraffin and ferrowax valves where the solid phase is melted by laser irradiation[11-13]. They have been used to pre-store and release highly reactive bromine water as well as to sequential release of reagents by employing different waxes of differing melting temperatures[12, 13]. However, requiring external power sources and inability to reseal the compartment make phase change valves less attractive for commercialization. Separate containers to store reagents are superior to their embedded counterparts. They are portable, can be stored apart from the system, can be more sophisticated and be made of any biocompatible material. These containers should be easy to integrate into LOC systems, easy to fabricate and should not impose additional costs. For example, reagents can be preserved in fragile glassy ampoules integrated to the LOC device and released by applying direct pressure to manually crash ampoules[14]. One of the disadvantages of this approach is the manual crushing of the ampoules which requires to halt the system in case of centrifugal microfluidics. Recently, researchers at IMTEK institute have designed and developed a pre-storage device for centrifugal microfluidics that merely relies on centrifugal forces[15]. They used sachet-like packs fabricated of vapor-tight aluminum composite foil to pre-store the reagents. The reagents enclosed in packs are inserted on the centrifugal microfluidics and released from the peelable side of the sachet-like pack when the spinning motor provides a certain centrifugal force that breaks the seal.

Apart from sachet-like containers that offer both simplicity and efficiency, other storage techniques hardly can find a way into commercialization or mass production. However, sachet-like containers are unable to stop the flow of reagents once actuated and need special machines to fabricate/seal them.

SUMMARY

In certain example embodiments described herein, a microfluidic device component comprises a core material that is press fit within one or more layers of an elastic sheath material that partially or fully covers the core material. The component may be shaped as cylinder, a cuboid, a polyhedral, a disc, a capsule, or a sphere. The core material may be solid or may be hollow or semi-hollow. In certain aspects, the core material defines an internal compartment suitable for storage of one or more reagents. The internal compartment may be accessible by one or more apertures in the side of the core material. The one or more reagents may be stored in liquid, dry, or gel form. The microfluidic device component may function as a valve, a pump, a filter, or a storage compartment with integrated valve and pump functions. The microfluidic device may be used in both centrifugal and non-centrifugal microfluidic devices. In certain aspects, the microfluidic device component is used to provide onboard storage of reagents. The microfluidic device may provide repeated proportional release of reagents during a given assay run.

In certain example embodiments a microfluidic device component for use, for example in LOC devise, is provided herein. The microfluidic device component may comprise a core material that is press fit within one or more layers of an elastic sheath material such that the elastic sheath material fully or partially covers the cover material. The core material may comprise one or more elastic materials, non-elastic materials or a combination thereof. Suitable non-elastic materials may comprise glass, crystal, silicon, titanium, or a non-elastic polymeric material. The core material may be shaped as a cylinder, cube, cuboid, polyhedral, disc, capsule, or sphere. The core material may be opaque, translucent, transparent, or comprises different portions that are individually opaque, translucent, or transparent.

In certain example embodiments material may comprise one or more internal compartments that are accessible by one or more openings in one or more sides of the core material. In certain example embodiments, the volume of the core material may range from 10 nL to 10 mL. The one or more internal compartments may further comprise a piston attached to a shaft or spring. In the case of two or more internal compartments, the internal compartments can be of the same or different size. In certain example embodiments, the compare may be opaque over some compartments and transparent or translucent over other compartments. In certain example embodiments, the two or more internal compartments may be in fluid communication with one another, or a subset of the internal compartments may be in fluid communication with one another. In certain example embodiments, the internal compartments in fluid communication with one another may further comprise a filter material located between the internal compartments.

In certain example embodiments, the exterior surface of the core material may comprise one or more indentations or be grooved around the circumference of the core material. In certain example materials, the exterior surface may comprise a single groove that winds around the core material from a first end to a second end. In certain example embodiments, the core material may be insulated.

The elastic sheath material into which the core material is press fit may be made of a an elastic material. Suitable elastic materials may include latex, butyl rubber, or a bio-compatible rubber-like material. The elastic sheath material may have a thickness ranging from 0.1 mm to 6 mm. In certain example embodiments, a filter material may be located between the core material and the elastic sheath material.

The microfluidic device components described herein may be incorporated into various microfluidic devices and function as storage compartment, pumps, valves, and filters.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 5 provides a side (top left), top (top right) and cross-sectional view (bottom left) of a microfluidic component device having regularly spaced grooves, in accordance with certain example embodiments.

FIG. 6 provides a top and cross-sectional view (top) of a microfluidic device component with both the core material and elastic sheath material combined, and a top view of the core material (bottom left) and top and cross-section view (bottom) right of the individual elastic sheath material, in accordance with certain example embodiments.

FIG. 8 provide a side, top, and cross-sectional view of a microfluidic device component comprising a set of grooves or indentations covered by a first elastic sheath material and a single aperture covered by a second sheath material, in accordance with certain example embodiments FIG. 9 provides a top, side, and cross-sectional view of a microfluidic device component comprising two grooves or indentations with the apertures being located within the grooves/indentations and where an elastic sheath material is configured to fit within the groove/indentation, in accordance with certain example embodiments.

DETAILED DESCRIPTION OF THE EXAMPLE EMBODIMENTS

Overview

Figure 1:
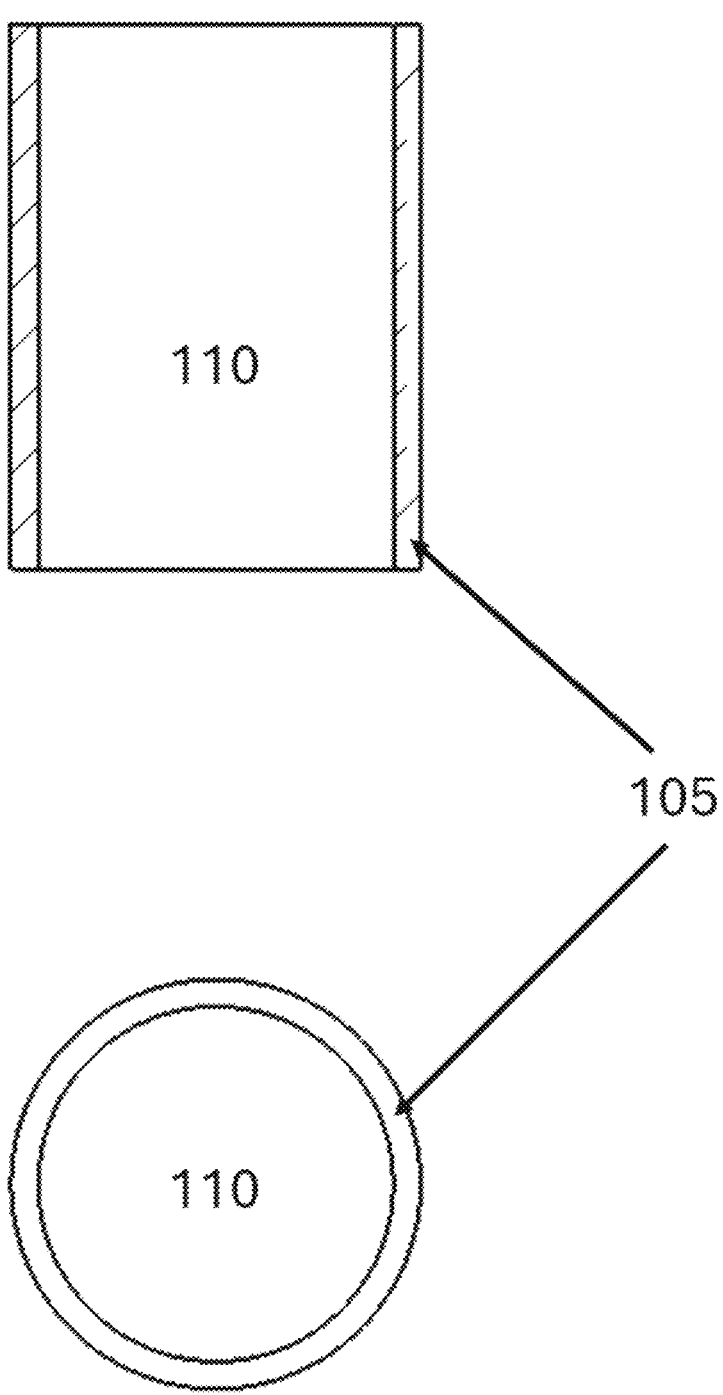
FIG. 1 provides a side (top) and cross-section (bottom) view of a cylindrical core material in accordance with certain example embodiments.

In light of the previously described restrictions and drawbacks of the available pre-storage devices, a simple but robust on-off pre-storage mechanism that can be easily implemented on various LOC devices is provided herein. The pre-storage mechanism hermetically seals, reseals the pre-storage containers and effectively releases the reagents in both stationary and rotating LOC systems. In the centrifugal microfluidics this device provides a seal-release-reseal control based on the frequency dependent inflation and deflation of the sealing tube covering the container. In the other LOC systems it is be based on the scalable manual/automatic external pressure excreted on the container.

Embodiments disclosed herein provide microfluidic device components that may be used independently as valves, pumps, filters or as storage containers (flasks) with integrated valve and pump mechanisms. The components described herein may be integrated into multiple microfluidic device designs, including centrifugal and non-centrifugal microfluidic devices ("linear microfluidic devices"). The primary use of the component is to store and/or dispense and/or move various reagents that may be employed on a microfluidic device to carry out any of a number of chemical and biological reactions and assays that may be done on such devices. The term lab-on-chip (LOC) and microfluidic device will be used interchangeably throughout this application.

The microfluidic device component may comprise a core material that is press fit within one or more layers of an elastic sheath material, such that the elastic sheath material fully or partially covers the core material. The elastic sheath material covers and seals the surface of the core material. In use, a force is applied to the component such that the elastic sheath material deforms from the surface of the core material. This deformation or un-sealing from the core material surface may allow fluids to flow between the core material and the elastic sheath material when used as a valve or pump and/or allow reagents stored inside the core material to be released when used as a storage container. The ability to provide on-board storage of reagents allows for the mass production of ready to use point of care (POC) LOC devices. On-board storage also removes the need for traditional pipetting steps required to load samples and reagents onto the device, which in turn allows the devices to have increased portability and shortened sample-to-result processing times.

Example Core Materials

The core material may be an elastic material, a non-elastic material, or a combination thereof. Example non-elastic materials include glass, borosilicate glass, soda-lime glass, crystal, silicon, or titanium. In certain example embodiments, the non-elastic material is glass, borosilicate glass, or soda-lie glass. Suitable elastic materials for use as core materials include elastic materials that are stiffer or have higher moduli of elasticity than the elastic sheath material such that the core material can maintain its shape when pressure from the sheath material is applied to the component. In certain example embodiments, the Young's modulus of the core material is between 100 MPa and 220 GPa.

Example elastic materials suitable for use as a core material include synthetic or natural rubbers (E=0.05 to 4.0 GPa), such as polybutadiene (E=0.91 GPa), urethane, or butyl rubber, cork (E=0.018 GPa), materials made of urea, or polymers with Young's modulus within the range noted above. Example polymers that may be used as a core material include polydimethylsiloxane (PDMS), polypropylene (PP), polycarbonate (PC), polyethylene (LDPE), poly(methyl)methacrylate (PMMA), flexible polyvinyl chloride (PVC), polytetrafluoroethylene, high density polyethylene (HDPE), polymethylpentene, Vitron®, PMMA, or gelatin gels. In certain example embodiments, the core material comprises polymers used in biomedical applications such as those used to produce vials e.g., PTFE/silicon, PDMS, PC, PMMA, or PET.

In certain example embodiments, the core material may comprise two or more materials. For example, the core material may comprise a combination of different elastic materials, different non-elastic materials, or a combination of elastic and non-elastic materials. In certain example embodiments, the core material may comprise two or more pieces that are press fit together. Each individual piece of the two or more pieces may comprise an elastic or non-elastic material described above. In one example embodiment, the core material comprises a non-elastic piece and an elastic piece that are press-fit together such as glass, silicon borosilicate glass as the non-elastic material and rubbers, PC, PMMA and PDMS as the elastic material.

In certain example embodiments, the core material may comprise a hollow or semi-hollow core defining an internal compartment. The internal compartment may be filled with a first material, while the remainder of the core material is made of a second material, or combination of materials. In certain example embodiments, the internal compartment is filled with a fluid, a powder, or a gel.

The core material may be formed in a number of different shapes. In certain example embodiments, the core material may be cylindrical, cuboidal, polyhedral, a disc, a capsule, or a sphere. In one example embodiment, the core material is cylindrical. In another example embodiment, the core material is cuboidal. In another example embodiment, the core material is polyhedral. In certain example embodiments, the polyhedral shape is a rectangular shape. In another example embodiment, the core material is shaped as a disc. In another example embodiment, the core material is shaped as a sphere. In another example embodiment, the core material is shaped as a capsule. In certain example embodiments, the container may comprise more than one or more shapes such that a portion of the container is one shape and another portion is a different shape. For example, the core material may have a partially circular and a partially rectangular cross-section, a partially circular and a partially square cross-section and so on.

The core material is sized for use in a microfluidic device. The size will depend on the function the component part is performing, i.e., a pump, a valve, a storage flask, and the shape, and space limitations dictated by the size of the LOC device. Cylindrical shaped core materials, for example, may have a length of approximately 4 mm to 100 mm. For core materials that comprise an internal compartment, the size may be defined by an internal diameter or internal volume. For example, a cylindrical core material may comprise an internal diameter of approximately 0.5 mm to 70 mm, 0.5 mm to 60 mm, 0.5 mm to 50 mm, 0.5 mm to 40 mm, 0.5 mm to 30 mm, 0.5 mm to 20 mm, 0.5 mm to 10 mm, 0.5 mm to 5 mm, 0.5 mm to 1 mm, 0.5 mm to 0.9 mm, 0.5 mm to 0.8 mm, 0.5 mm to 0.7 mm, 0.5 to 0.6 mm, 1 mm to 10 mm, 1 mm to 9 mm, 1 mm to 8 mm, 1 mm to 7 mm, 1 mm to 6 mm, 1 mm to 5 mm, 1 mm to 4 mm, 1 mm to 3 mm, 1 mm to 2 mm, 10 mm to 50 mm, 15 mm to 50 mm, 20 mm to 50 mm, 25 mm to 50 mm, 30 mm to 50 mm, or 35 mm to 50 mm, 40 mm to 50 mm, or 45 mm to 50 mm.

A cuboidal core material may define an internal volume of approximately 10 nL to 10 mL, 1 nL to 5 mL, 1 nL to 1mL, 1 nL to 900 nL, 1 nL to 800 nL, 1 nL to 700 nL, 1 nL to 600 nL, 1 nL to 500 nL, 1 nL to 400 nL, 1 nL to 300 nL, 1 nL to 200 nL, 1 nL to 100 nL, 1 nL to 90 nL, 1 nL to 80 nL, 1 nL to 70 nL, 1 nL to 60 nL, 1 nL to 50 nL, 1 nL to 40 nL, 1 nL to 30 nL, 1 nL to 20 nL, 1 nL to 10 nL, 1 nL to 5 nL, 100 nL to 1 mL, 200 nl to 1 mL, 300 nL to 1 mL 400 nL to 1mL, 500 nL to 1 mL, 600 nL to 1 mL, 700 nL to 1 mL, 800 nL to 1 mL, 900 nL to 1 mL, 1 mL to 10 mL, 1 mL to 9 mL, 1 mL to 8 mL, 1 mL to 7 mL, 1 mL to 6 mL, 1 mL to 5 mL, 1 mL to 4 mL, 1 mL to 3 mL, or 1 mL to 2 mL.

A disc-shaped core material may define an internal volume of 10 nL to 10 mL, 1 nL to 5 mL, 1 nL to 1mL, 1 nL to 900 nL, 1 nL to 800 nL, 1 nL to 700 nL, 1 nL to 600 nL, 1 nL to 500 nL, 1 nL to 400 nL, 1 nL to 300 nL, 1 nL to 200 nL, 1 nL to 100 nL, 1 nL to 90 nL, 1 nL to 80 nL, 1 nL to 70 nL, 1 nL to 60 nL, 1 nL to 50 nL, 1 nL to 40 nL, 1 nL to 30 nL, 1 nL to 20 nL, 1 nL to 10 nL, 1 nL to 5 nL, 100 nL to 1 mL, 200 nl to 1 mL, 300 nL to 1 mL 400 nL to 1mL, 500 nL to 1 mL, 600 nL to 1 mL, 700 nL to 1 mL, 800 nL to 1 mL, 900 nL to 1 mL, 1 mL to 10 mL, 1 mL to 9 mL, 1 mL to 8 mL, 1 mL to 7 mL, 1 mL to 6 mL, 1 mL to 5 mL, 1 mL to 4 mL, 1 mL to 3 mL, or 1 mL to 2 mL. In certain example embodiments, core material may have an external wall thickness of approximately 0.1 mm to 20 mm.

In certain example embodiments, the core material comprises one or more internal compartments. In one example embodiment, the core material defines a single internal compartment. The single compartment may have a volume of approximately 10 nL to 10 mL, 1 nL to 5 mL, 1 nL to 1mL, 1 nL to 900 nL, 1 nL to 800 nL, 1 nL to 700 nL, 1 nL to 600 nL, 1 nL to 500 nL, 1 nL to 400 nL, 1 nL to 300 nL, 1 nL to 200 nL, 1 nL to 100 nL, 1 nL to 90 nL, 1 nL to 80 nL, 1 nL to 70 nL, 1 nL to 60 nL, 1 nL to 50 nL, 1 nL to 40 nL, 1 nL to 30 nL, 1 nL to 20 nL, 1 nL to 10 nL, 1 nL to 5 nL, 100 nL to 1 mL, 200 nl to 1 mL, 300 nL to 1 mL 400 nL to 1mL, 500 nL to 1 mL, 600 nL to 1 mL, 700 nL to 1 mL, 800 nL to 1 mL, 900 nL to 1 mL, 1 mL to 10 mL, 1 mL to 9 mL, 1 mL to 8 mL, 1 mL to 7 mL, 1 mL to 6 mL, 1 mL to 5 mL, 1 mL to 4 mL, 1 mL to 3 mL, or 1 mL to 2 mL. In certain example embodiments, the core material may comprise two or more compartments.

In the case of multiple compartments, each internal compartment may be the same size or different sizes. The relative size of each compartment will depend at least in part on the fluid or reagent to be stored in each compartment and the role such reagents play in the assay to be carried out on the LOC device. For example, the two or more compartments may be varied in size so that the correct ratio of different reagents stored in each compartment is achieved as the reagents are released from the component onto the LOC device, for example to facilitate mixing upon release. As one of ordinary skill in the art will recognize, the upper limit on the number of compartments is linked to the maximize size of the core material which is further determine by size constraints imposed by LOC devices into which the component is to be incorporated. In certain example embodiments, the core material comprises two, three, four, five, or six internal compartments.

In certain example embodiments, each internal compartment is accessible by one or more apertures in the core material. Each compartment may be accessible by only a single aperture on a single side of the core material, by more than one aperture on the same side of the core material, or by more than one aperture with the different apertures placed on multiple sides of the core material. The apertures allow fluid communication into and/or out of the internal compartment. The length of the opening will depend on the thickness of the wall of the core material defining the internal compartment(s). The diameter or width of the opening may be from 5 micrometer to 5 mm. In certain contexts, the width of the opening will depend in part on the volume of the fluid to be released from the internal compartment, the flow rate, or both. In certain example embodiments, a narrow tubing may be used that passes through the aperture and extends to a far end of an interior compartment or connects to multiple interior compartments to facilitate distribution of the fluid within the interior compartment or compartments.

In certain example embodiments a pore membrane material may be placed between the core material and the elastic sheath material, where the pore membrane at least covers the portion of the core material with an aperture or apertures. Example pore materials include polyvinylidene fluoride (PVDF), polytetrafluoroethylene(PTFE), nitrocellulose.

In certain example embodiments, the core material may be made of a transparent material, a translucent material, or an opaque material depending on the light sensitivity of a reagent stored within the core material, or the need for certain reagents stored within the core material to be accessible to certain wavelengths of light during an assay. In certain example embodiments, the core material may be made from a transparent material and overlaid on the surface with a material that renders the core material translucent or opaque. Likewise, the core material may be made with a translucent material that is overlaid on the surface with a material that renders the core material opaque. In certain example embodiments, the core material may be transparent or translucent and overlaid on the surface with a filter material that filters out certain wavelengths of electromagnetic radiation, for example, in the ultraviolet, infrared, or visible spectrum. In certain example embodiments, the core material may comprise different portions that are opaque, transparent, or translucent. For example, the core material may be made of a first portion that is transparent and a second portion that is opaque.

In certain example embodiments, the core material may further comprise an insulating material. The insulating material may comprise a layer that is internal or external to the core material. Example insulating materials that may be used with the context of the component parts include, thermoplastic polyurethane (TPU), polystyrene, polyetheretherketone (PEEK) or materials with similar insulating characteristics. In certain example embodiments, the insulating function may reside in selection of an appropriate elastic sheath material. In other example embodiments, the insulating material may be disposed between the core material and the elastic sheath material. In certain other example embodiments, the insulating material may be disposed over and fully or partially cover the elastic sheath material.

The surface of the core material may be smooth, grooved, or indented. In certain example embodiments the core material is smooth. In certain other example embodiments, the surface of the core material may comprise a groove or series of grooves. In another example embodiment, the surface of the core material may comprise one or more indentations.

Example Elastic Sheath Material

The core materials described above are press-fit into an elastic sheath material. The elastic sheath material may fully or partially cover the core material. The elastic sheath material may be an elastic or hyper-elastic material having a Young's modulus in the range of 10 MPa to 4 GPa. The elastic sheath material should have greater elasticity than that of the core material such that the elastic sheath material will deform or inflate upon the application of certain pressure or force to the elastic sheath material. Example materials for use as elastic sheath materials include latex, butyl rubber, a sponge or foam rubber such as silicone sponge, open cell sponge, closed cell sponge, nitrile rubber, silicone foam, EPDM foam, polyethylene foam or a bio-compatible rubber like material. In one example embodiment, the elastic sheath material is a natural rubber latex with an approximate Shore Durometer type A of 35. Some sheath materials can also function well as insulators examples of these materials are natural and syntactic rubbers. The preferred sheath materials in general are latex rubbers, syntactic and natural rubbers and sponge or foam rubbers. In certain example embodiments, the elastic material may be similar to that used in injection vials which create a vacuum inside the core material and facilitate filling of an interior compartment. In certain example embodiment, the elastic sheath material may be made from heat-shrink tubing. In certain other example embodiments, the elastic material may be mad from bioabsorbable tubing including enginnered polymers (PEEK, PEI, or PES), thermoplastic elastomers (Hytrel®, Engage®, or Pebax®), bioabsorables (PGA, PLLA, copolymers) and fluoropolymers (Teflon®, AF, PVDF, Nafion®, PFA), or customer-supplied resin.

The elastic sheath material may have a thickness of 0.1 mm to 6.0 mm. In certain example embodiments, the thickness of the elastic sheath material is 0.1 to 1mm, 0.1 mm to 0.9 mm, 0.1 to 0.8 mm, 0.1. to 0.7 mm, 0.1 to 0.6 mm, 0.1 to 0.5 mm, 0.1 mm to 0.4 mm, 0.1 mm to 0.3 mm, 0.1 mm to 0.2 mm. In other example embodiments, the thickness of the elastic material is 1 mm to 6 mm, 1 mm to 5 mm, 1 mm to 4 mm, 1 mm to 3 mm, or 1 mm to 2 mm. In another example embodiment, from 0.4 mm to 4 mm, 0.3 to 3 mm, 0.2 to 2 mm.

In certain example embodiment, a lubricant may be used between the elastic and non-elastic sheath and elastic sheath and non-elastic containers described herein. The lubricants may be a wax, synthetic oils, natural oils, oleochemicals, ointments, seed oils, mineral oils of different purity and different grades. In certain embodiments, moisturizers may also be alone or in combination with lubricants. Example moisturizers may include Vasoline, olive oil, coconut oil, tallow, aquaphor, lipsticks, jojob oil, shea butter, food grade mineral oil and son.

Turning now to the drawings, in which like numerals represent like (but not necessarily identical) elements throughout the figures, some example embodiments are described in detail.

Piston Modifications

In certain example embodiments, the example core material may be further modified internally to comprise a piston connected to a solid shaft or spring. The piston may be a flat piston. The flat piston may be made of materials similar to the elastic sheath material. The piston material should be selected on ability to form a seal with the interior of the core material. The solid shaft and spring may be selected from materials recognized within the art as suitable for use in microfluidic device components of the size and type disclosed herein. The spring may be pre-pressed and programed to provide a gradual release of contents from the microfluidic device component over time.

Example Embodiments

FIG. 1 provides a top and cross-section view of an example cylindrical core material 105. The core material 105 has a hollow interior defining an internal compartment 110. As noted above, in certain example embodiments, the core material 105 may be solid throughout.

Figure 2:
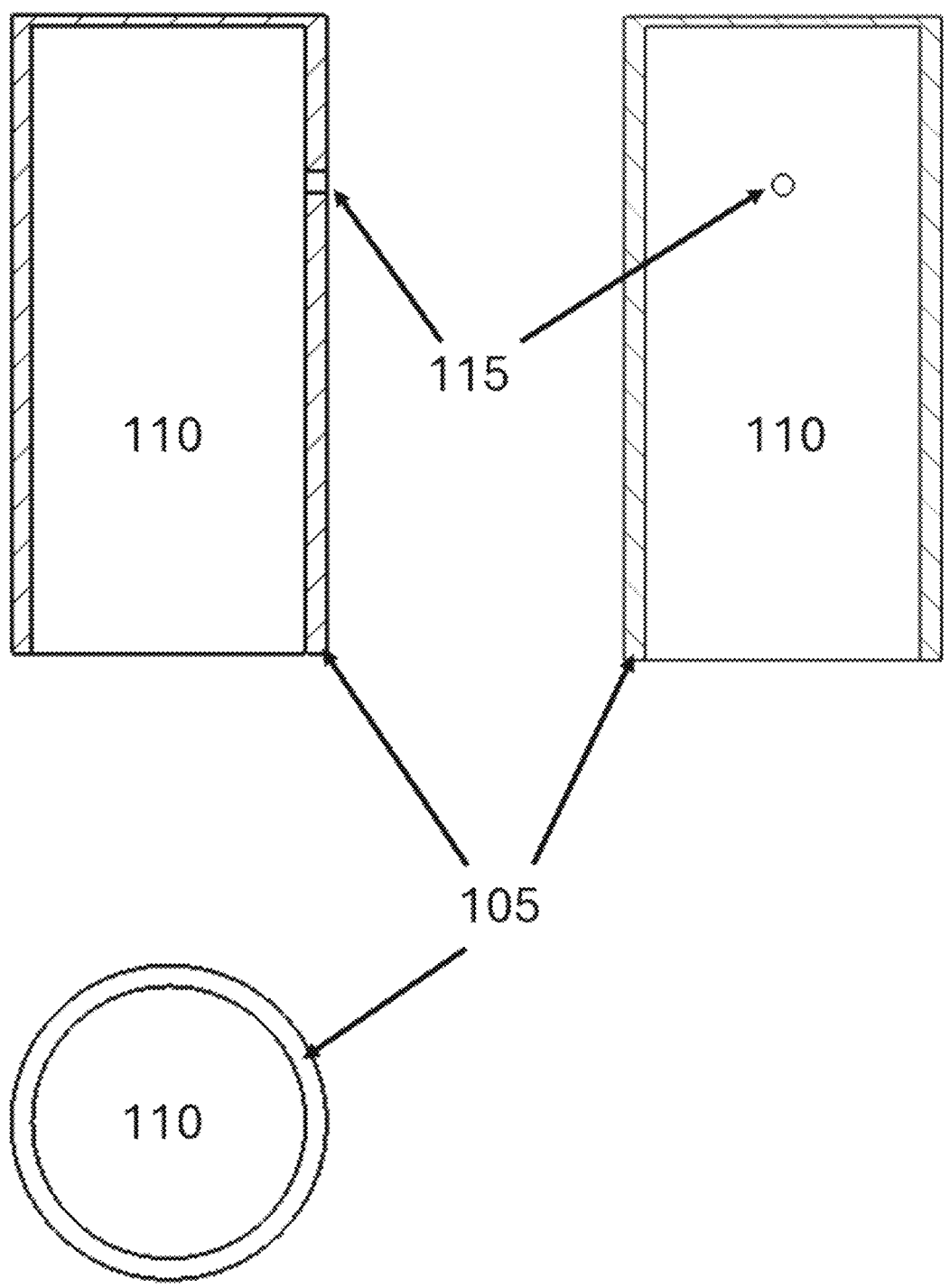
FIG. 2 provides a side (top left), top (top right), and cross section (bottom left) view of a cylindrical core material have an internal compartment accessible by a single aperture, in accordance with certain example embodiments.

Turning to FIG. 2, a side (top left), top (top right), and cross-section view (bottom left) of an example cylindrical core material 105 is provided. The core material 105 further comprises a single aperture 115 providing access to an internal compartment 110.

Figure 3:
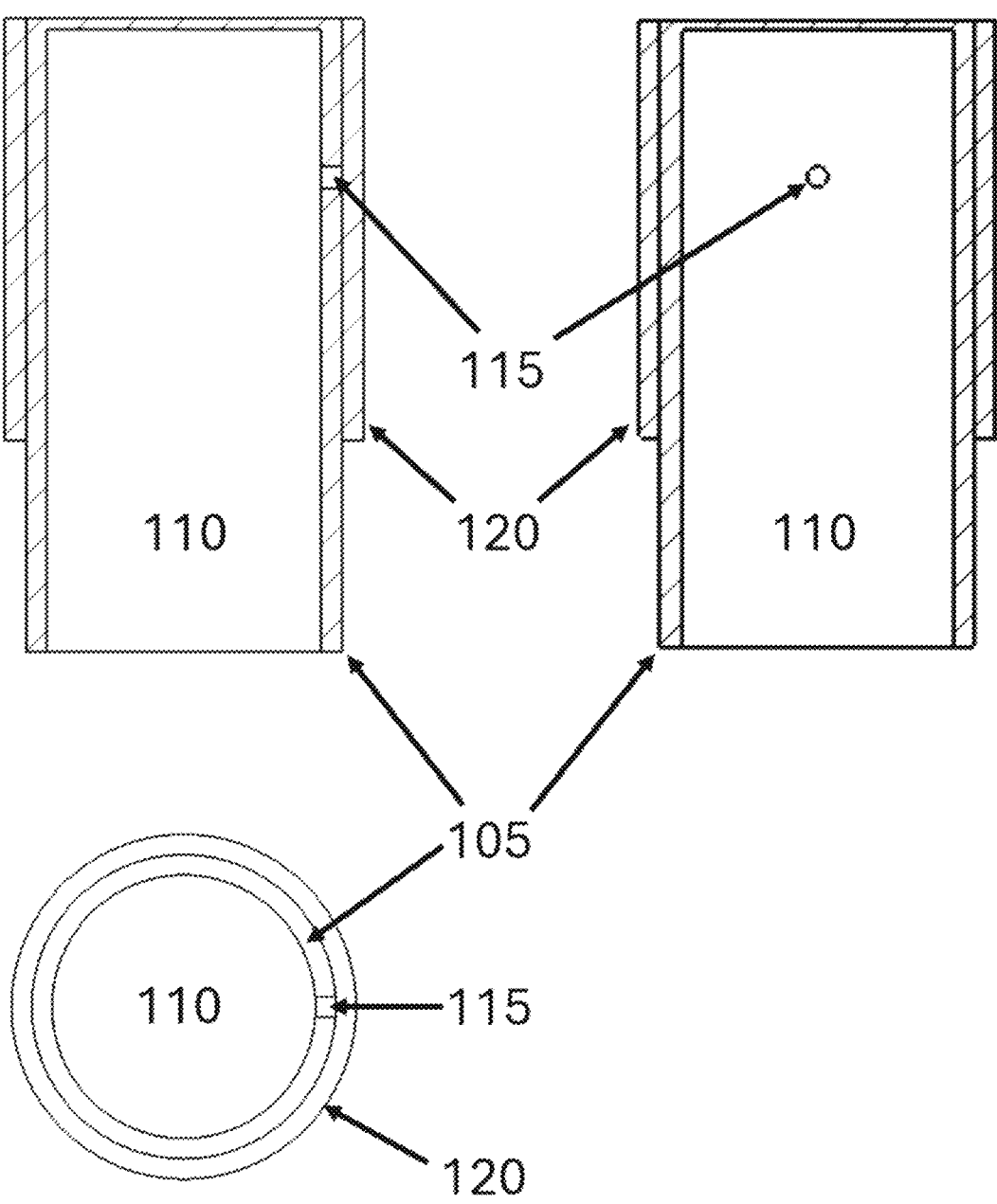
FIG. 3 provides a side view (top left), top (top right), and cross-section (bottom left) view of a microfluidic device component having an internal compartment accessible by a single aperture, in accordance with certain example embodiments.

Turning to FIG. 3, a side (top left), top (top right), and cross-section (bottom left) view are provided of an example microfluidic device component 300. The microfluidic device component 300 comprises a cylindrical core material 105 press fit within an elastic sheath material 120. The core material further comprises a single aperture 115 providing access to in an internal compartment 110.

Figure 4:
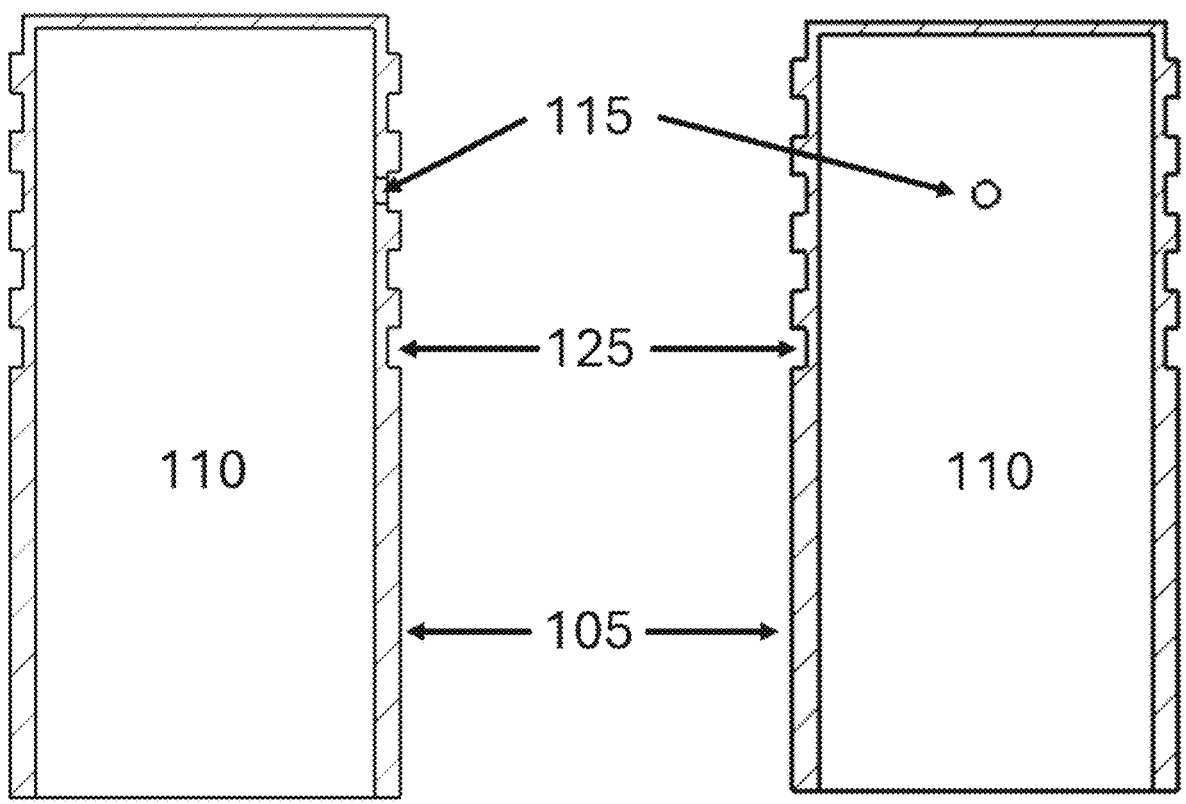
FIG. 4 provides a side (left) and top (right) view of a core material defining an internal compartment accessible by an aperture and having regularly spaced grooves, in accordance with certain example embodiments.

Turning to FIG. 4, a side (left) and top (right) view are provided of an example core material 105 further comprising a set of regularly spaced grooves 125 that run the entire circumference of the core material 105. The core material 105 further comprises a single aperture 115 providing access to an internal compartment 110 and in communication with one of the grooves 125.

Turning to FIG. 5, a side (top left), top (top right), and cross section (bottom left) are provided of an example microfluidic device component 500. The microfluidic device component 500 comprises a cylindrical core material 105 press fit within an elastic sheath material 120. The core material 105 further comprises a set of regularly spaced grooves 125 around the circumference of the core material surface and an aperture 115 providing access to an internal compartment 110. The aperture 115 is connected to one of the grooves 125. The elastic sheath material 120 covers the aperture 115 and grooves 125.

Turning to FIG. 6, an O-ring type microfluidic device component 600 is provided. The microfluidic device component 600 comprises a core material 105 comprising a single indention or groove 125 around the outer circumference of the core material 105. The core material 105 comprises an aperture 115 connecting the groove 125 to an internal compartment 110. The groove 125 is sized to fit an O-ring shaped elastic sheath material 120.

Figure 7:
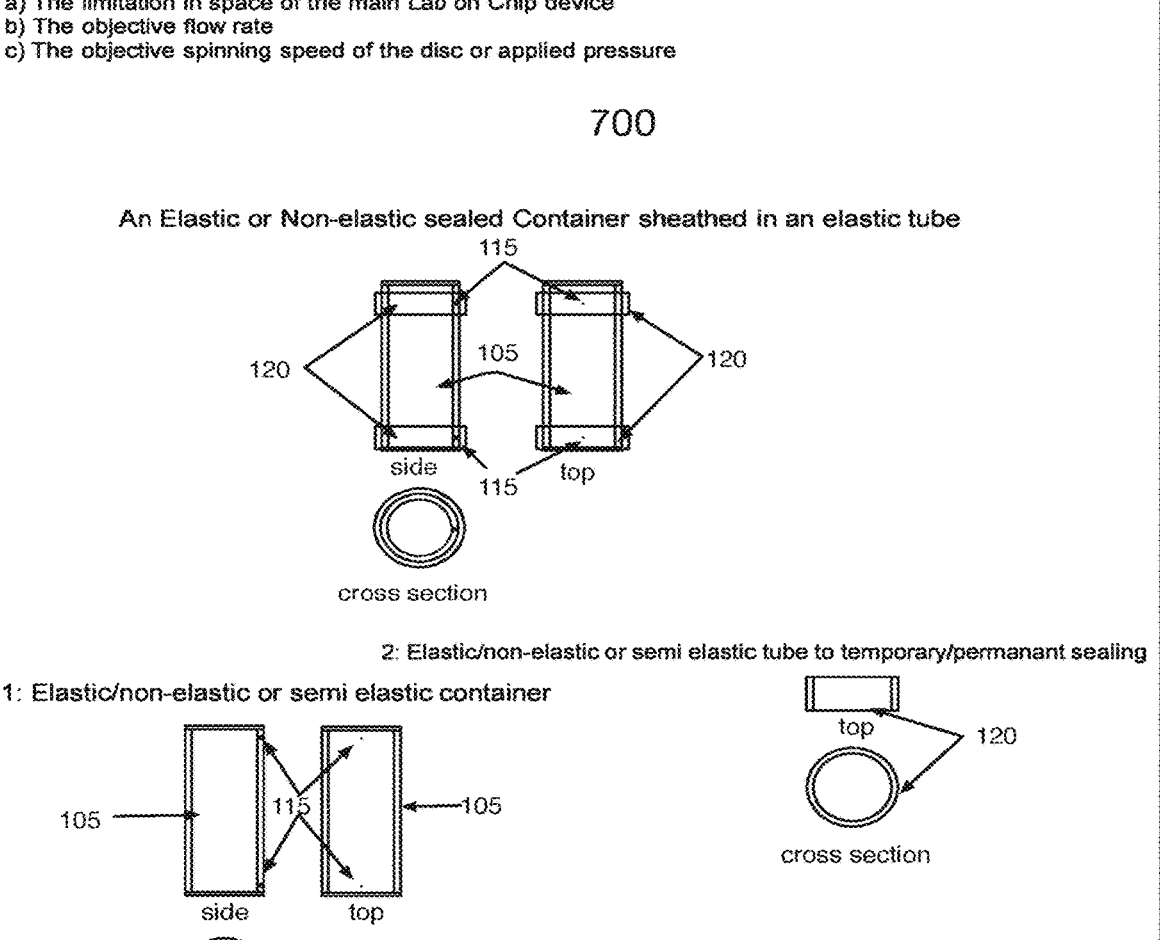
FIG. 7 provides a side, top, and cross sectional view of a microfluidic device component comprising two elastic sheath materials covering two apertures, in accordance with certain example embodiments.

Turning to FIG. 7, an alternative O-ring type microfluidic device component 700 is provided. The microfluidic device component 700 comprises a core material 105 comprising two apertures 115 located on opposite ends on a same face of the core material 105. The apertures may also be located on opposite ends of different faces. Two O-ring shaped elastic sheath materials 120 are placed over the core material 105 such that the each elastic sheath material covers one of the apertures 115 and such that it can be displaced during operation of the microfluidic device to allow fluids to flow in or out of the apertures 115 and into the interior of the core material 105.

Turning to FIG. 8, a microfluidic device component 800 comprising aspects of the different design elements described above is provided. A core material 105 comprises two apertures 115 like those disclosed in FIG. 7. In addition, a portion of the core material 105 body comprises a set of grooves 125 such as those disclosed in FIG. 5. The microfluidic device component 800 further comprises a first elastic sheath material 120a and a second elastic sheath material 120b. The first elastic sheath material 120a is sized to cover the portion of the core material 105 comprising the set of grooves 125. The second core material 120b is sized to cover the portion of the core material 105 comprising an aperture 115 and no grooves.

Figure 9:
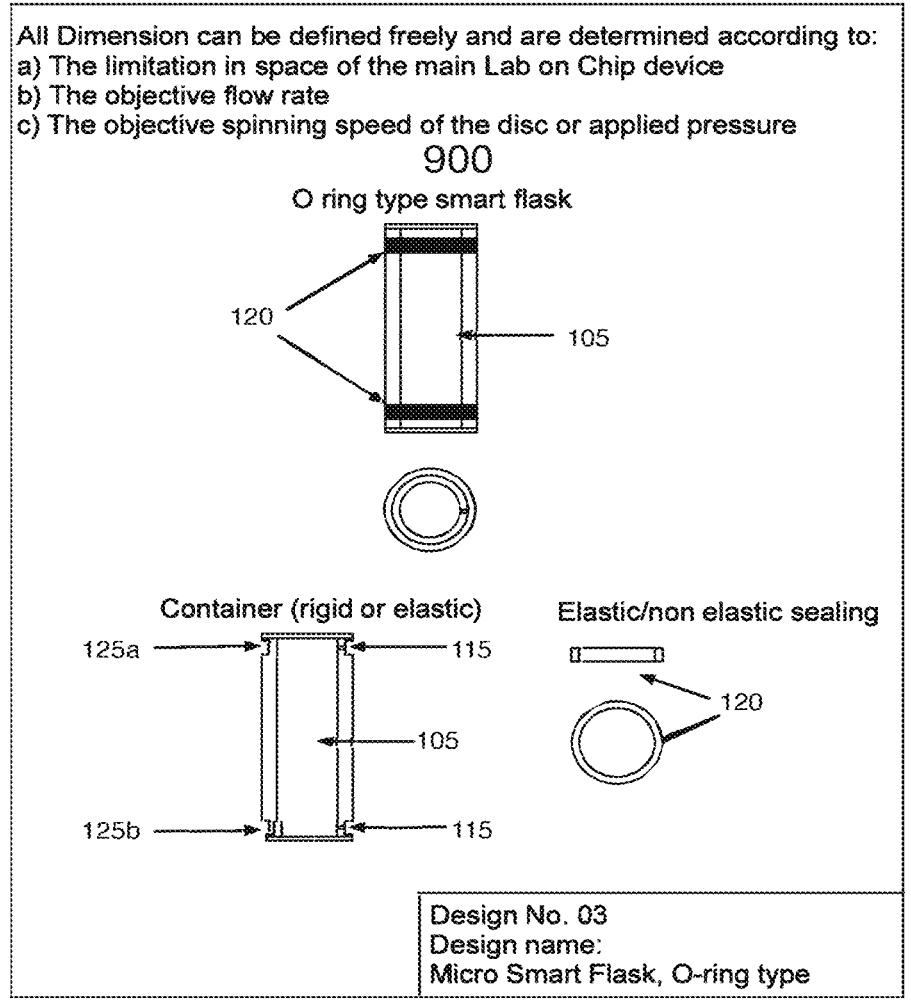

Turning to FIG. 9, a microfluidic device component 900 is provided. The microfluidic device component 900 comprises a core material 105. The core material 105 comprises two grooves 125a and 125b on opposite ends of the core material 105. Within each groove is an aperture 115 that is in fluid communication with an interior portion of the core material 105. The microfluidic device component 900 further comprises two elastic sheath materials 120 that are sized to fit within grooves 125a and 125b.

Figure 10:
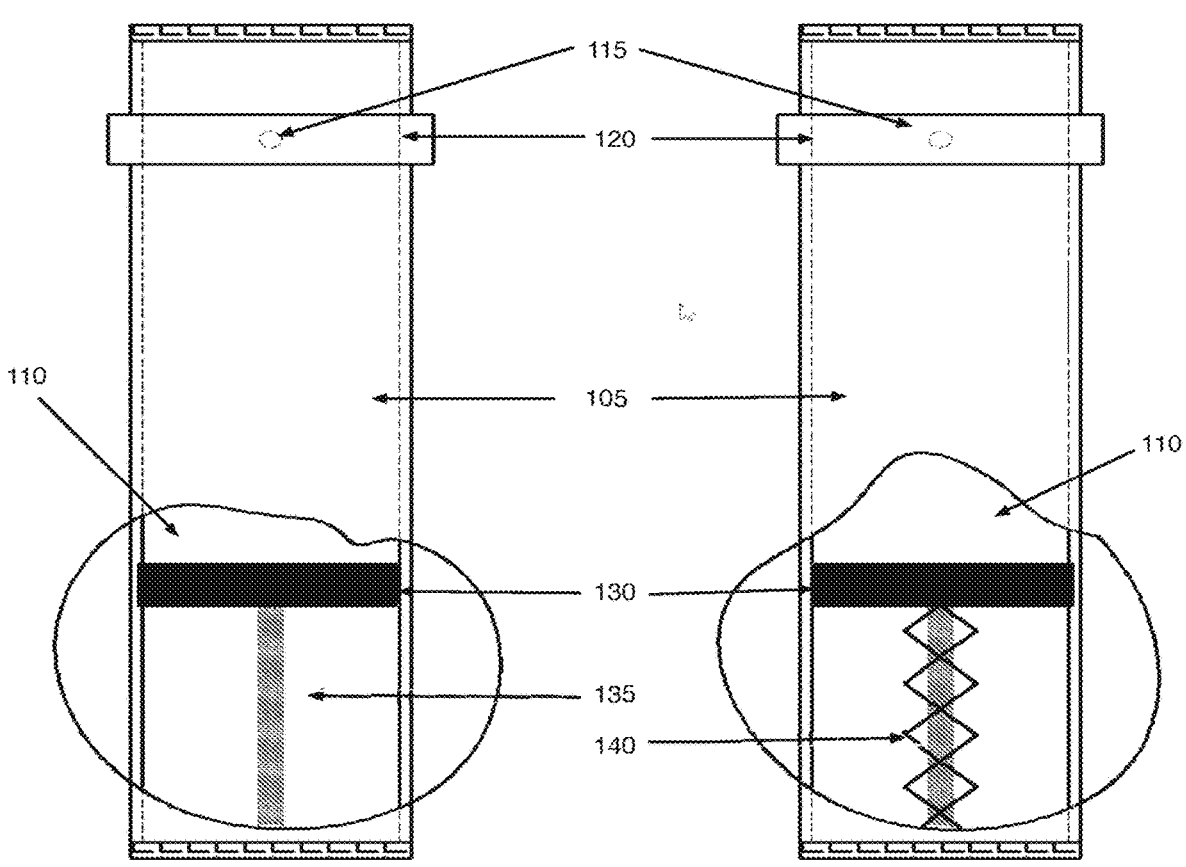
FIG. 10 provides a top cut away view of an example microfluidic device component further comprising a flat piston connected to a shaft or spring.

Turning to FIG. 10, an alternative microfluidic device component 1000 is provided. The microfluidic device component 1000 comprises a core material 105 and an aperture 115. An elastic sheath material 120 seals the aperture 115. An internal compartment 110 of the device component 1000 comprises a flat piston 130 attached to a shaft 135 or a spring 140. The spring may be pre-pressed to release contents of the microfluidic device component 1000 at a desired rate when the microfluidic device component 1000 is actuated, for example by centrifugal force when incorporated into a centrifugal microfluidic device.

The following provide additional example embodiments for which the microfluidic device components described herein may be adapted for use on microfluidic devices. For reference, the microfluidic device components in the following example embodiments are discussed relative to the example embodiments shown in FIGS. 1-10 and their corresponding named parts.

Microfluidic Storage Compartments

The microfluidic storage ("flask") components described herein allow for the onboard storage of reagents on the LOC device, thereby eliminating the need to introduce reagents by manual or mechanical pipetting means. Likewise, the storage components may allow for proportional release of reagent over many cycles. In contrast, current onboard storage mechanism takes an all or none approach. That is, once existing storage components are opened the entire contents of the storage component are released at once. In contrast, the ability of the storage components described herein to be resealed allows for repeated proportional release of the regents stored therein as needed over a particular assay run.

The flask comprises a core material press fit within an elastic sheath material such that the elastic sheath material partially or fully covers the core material. The valve core material and elastic sheath material may be anyone of the core materials described above. In one example embodiment the core material is a non-elastic material. In another example embodiment, the core material comprises an elastic material. As noted above the elasticity of the core material should be lower than that of the elastic sheath material. The core material may be shaped as a cylinder, cube, cuboid, polyhedral, disc, sphere, or capsule. In one example embodiment it is shaped as a cylinder. In another example embodiment, the flask is shaped as a cube. In another example embodiment, the flask is shaped as a cuboid. In another example embodiment, the flask is shaped as a polyhedral. In another example embodiment, the flask is shaped as a disc. In another example embodiment, the flask is shaped as a sphere. In another example embodiment, the flask is shaped as a capsule.

The core material further comprises at least one internal compartment. The volume of the compartment may range from 10 nL to 10 mL, 1 nL to 5 mL, 1 nL to 1 mL, 1 nL to 900 nL, 1 nL to 800 nL, 1 nL to 700 nL, 1 nL to 600 nL, 1 nL to 500 nL, 1 nL to 400 nL, 1 nL to 300 nL, 1 nL to 200 nL, 1 nL to 100 nL, 1 nL to 90 nL, 1 nL to 80 nL, 1 nL to 70 nL, 1 nL to 60 nL, 1 nL to 50 nL, 1 nL to 40 nL, 1 nL to 30 nL, 1 nL to 20 nL, 1 nL to 10 nL, 1 nL to 5 nL, 100 nL to 1 mL, 200 nl to 1 mL, 300 nL to 1 mL 400 nL to 1mL, 500 nL to 1 mL, 600 nL to 1 mL, 700 nL to 1 mL, 800 nL to 1 mL, 900 nL to 1 mL, 1 mL to 10 mL, 1 mL to 9 mL, 1 mL to 8 mL, 1 mL to 7 mL, 1 mL to 6 mL, 1 mL to 5 mL, 1 mL to 4 mL, 1 mL to 3 mL, or 1 mL to 2 mL. In certain example embodiments, the storage container has one, two, three, four, five, six, seven, eight, nine or ten internal compartments. Each compartment may be the same size or different size and configured to hold different reagents in the proper proportions such reagents should be released and combined from the LOC device. The portion of the outer core material covering each compartment may—individually—be opaque, translucent, or transparent.

Each internal compartment is accessible via one or more apertures in the core material. Each compartment may be accessible by a single aperture through a single side of the core material, multiple apertures through a single side of the core material, or multiple apertures through multiple sides of the core material.

In certain example embodiments, the inner surface of the core material forming the internal compartments may be coated with a passivating agent to prevent absorption or adsorption of certain biological or chemical molecules. Suitable passivating agents are known in the art and include, but are not limited to, silanes, parylene, n-Dodecyl-b-D-matoside (DDM), pluronic, Tween-20, other similar surfactants, polyethylene glycol (PEG), albumin, collagen, and other similar proteins and peptides.

In certain example embodiments, the surface of the core material may be smooth or may contain one or more grooves or indentations. In one example embodiment, the surface of the core material is smooth, or essentially smooth. In another example embodiment, the surface of the core material comprises one or more grooves. In yet another example embodiment, the surface of the core material has one or more indentations. The indentations or grooves may be regularly spaced. A groove extends around the entire outer circumference of the core material. The grooves may form an independent channel, one more connected channels, or a single continuous channel e.g. a continuous spiral around the outside of the core material. The indentations may be on single side, two sides, or three sides of the core material. In one example embodiment, the core material has a series of regularly spaced indentations as show in FIG. 5. The storage compartment may be configured so that when a reagent is released from the storage compartment it sequentially fills an indentation or groove in the core material. With each actuation of the storage container the indentations are sequentially filled and then released from the last indentation onto the LOC device. In one example embodiment, core material comprises up to 50 of indentations on a single side, two sides, or more than two sides of the core material. The indentations have a volume of approximately 10 nanoliter to 60 microliter and may be placed 10 micrometer to 500 micrometer apart.

The storage component may be used to store dry and liquid reagents such as enzymes, lysis buffer, saline, sterile dilution water, elution buffers, lateral flow buffers, wash buffers, water, nucleic acid primers, surfactants, fluorophores, hydrogels and particles which are currently sprayed, deposited, or pipetted manually or by using robots into microfluidic devices. For example, the storage components may be used to store all of the reagents needed to conduct a nucleic acid amplification or immunological diagnostic test currently conducted on microfluidic devices.

In operation, the storage compartments are filled with one or more reagents. The reagents may be in liquid, dry powder, or gel form. The type of reagent will depend on the assay to be carried out and the location of a particular storage compartment in the layout of a given microfluidic device. When release of the one or more agents stored in the storage container is desired a pressure may be applied to the storage compartment. The application of pressure causes the elastic sheath material to deform from the core material thereby releasing the tight seal of the elastic sheath around the surface of the core material. This release of the seal allows reagents stored in the one or more compartments to be released via the one or more apertures. The released reagent would then flow into a channel or compartment of the LOC device with which the flask is in fluid communication. In the context of a centrifugal chip, the force is applied by a centrifugal force when the LOC device is spun at the appropriate speed. Therefore, the frequency and speed at which the centrifugal chip is released will dictate the order in sequence in which reagents are released from the storage compartment. In linear microfluidic device the force may be applied by an actuator. The actuator may be any known in the art as suitable for use with the LOC device.

In certain example embodiments, storage compartments on the same LOC device may be made from different materials. For example, each storage compartment may be configured with a different elastic material such that a different applied force is required to deform the elastic material. In this way, a different series of pressures may be applied to control the sequence from which reagents are released from individual storage compartments.

Microfluidic Device Valve and Pump Components

In another aspect, the microfluidic device components described herein may be used as valves and/or pumps independent of any storage function. For illustration purposes the following paragraphs will describe a valve component. However, it should be understood that a pump component may comprise any of the various features of the valve component with the primary difference being in mode of operation. That is the primary difference in between a valve or pump may lie in the frequency with which the component is actuated i.e. frequent actuation of the valve component to generate a pumping action.

The valve comprises a core material press fit within an elastic sheath material such that the elastic sheath material partially or fully covers the core material. The valve core material and elastic sheath material may be anyone of the core materials described above. In one example embodiment the core material is a non-elastic material. In another example embodiment, the core material comprises an elastic material. As noted above the elasticity of the core material should be lower than that of the elastic sheath material.

In certain example embodiments, the core material is shaped as a cylinder, a cuboid, or a disc. In certain example embodiments the core material of a valve component is shaped as a cylinder with an internal diameter between 50 μm to 5 mm and a height of at least 3 mm. In certain other example embodiments, the core material of a valve component is shaped as a disc and has an internal diameter of at least 3 mm and a height of at least 500 μm. In certain other example embodiments, the core material of a valve component is shaped as a cuboid with a width of at least 3 mm, a length of at least 3 mm, and a height of at least 400 μm.

In certain example embodiments, the valve component may function as a spray value. In the context of spray valves, the elastic sheath material may comprise a permeable elastic material such as a sponge rubber, foam rubber, silicone sponge, open cell sponge, closed cell sponge, nitrile rubber, silicon foam, EPDM foam, or polyethylene foam.

In operation the valve or pump component will be integrated into a LOC where the respective flow control of reagents on a LOC device is needed. The valve or pump component may be placed at a junction between flow channels or compartments on a LOC device. The valve or pump may be sized so that the channel or chamber of the LOC device seals against the core material and at least a portion of the elastic sheath material closest to the core material. In a non-actuated state, the elastic sheath material seals the surface of the core material and prevents flow of any reagent through the junction. Actuation of the valve or pump requires application of a force to the valve or pump component surface. In the context of centrifugal LOC device, the force is supplied by a centrifugal force. In the context of a linear microfluidic device, the force may be applied by pressure or any mechanical actuator known in the art. The application of force deforms the elastic sheath material causing the elastic sheath material to separate from the surface of the core material. This separation creates gaps between the elastic sheath material and the core material that allows reagents to flow through the junction. In certain example embodiments, the junction in which the valve or pump component is situated may be configured to constrain the elastic sheath material so that deformation occurs in only a certain direction.

Microfluidic Device Filtration Components

In another aspect, the microfluidic device components described herein may be used for filtration and separation of materials on a microfluidic device. For example, the separation and filtration of various substances is a fundamental task in many chemical and biochemical processes. The target elements to be separated or filtered may include macromolecules, metabolites, nucleic acids and proteins to larger substances like solid particles (e.g. bead capture substrate, colloidal particles etc.) and cells.

In one example embodiment, the filter comprises a core material comprising one or more internal compartments—as discussed above regarding valves, pumps, and storage containers—wherein each internal compartment is separated by a porous material. The porous material is selected based on having a pore size sufficient to filter/separate the target material. The core material may comprise one or more apertures in a first and last compartment ("the terminal compartments"). A solution enters the filter via a first aperture or set of apertures in a first compartment and passes through one or more intermediate compartments, via the porous materials situated between each compartment, until exiting the filter device via one or more apertures in a last compartment. It should be understood that the term first and last compartment are relative terms for orientation purposes. In certain example embodiments, the filter may be used bi-directionally such that what is a first compartment when a solution is moved through the device in one direction and then becomes a last compartment when solution is moved through the device in the opposite direction, and vice versa. The filter device may further comprise the core material press fit within an elastic sheath material. The elastic sheath material may be any of the materials described previously regarding use as a valve or pump. As with the valve/pump the elastic sheath material may have a pressure applied at a frequency sufficient to operate as a valve or pump. In operation, the elastic sheath material provides the same pumping/valve function as described previously to allow entry to and exit from and/or help push the solution to be filtered into and through the core material.

In another example embodiment. The filtration component is provided by the elastic sheath material. That is, the filter comprises a core material press fit into a porous elastic sheath material. The core material may be any core material as described previously. However, in this embodiment the core material does not comprise one or more apertures. In operation the filter may be placed at a junction in the reaction flow channels of a microfluidic device where filtration/separation of a solution or suspension is desired. The junction may be sized so that the solution/suspension entering the filter is forced around the outer surfaces of the core material and then forced to pass through the pores of the sheath material surrounding the outside of the core material, whereby materials too large to fit through the pore size of the sheath material are retained by the filter. The elastic sheath material should retain its seal around the core material device throughout operation of the microfluidic device. That is the sheath material must be selected from a material that will not deform or otherwise separate from the surface of the core material during operation of the microfluidic device. For filters incorporated into linear microfluidic devices, no pressure is applied to the filter component. Therefore, the elastic sheath material may be any material listed previously. For centrifugal microfluidic devices, the elastic sheath material should have an elasticity that will not deform within the range of operational speeds of the centrifugal device. Example elastic sheath materials suitable for use in centrifugal microfluidic devices include, but are not limited to, PVDF (E=1 to 10 GPa), polytetrafluoroethylene (PTFE, E=0.5 to 4 GPa), nylon, and nitrocellulose. The pore size of the elastic sheath material may be between 0.01- 0.1 μm, 0.1-0.2 μm, 0.2-0.3 μm, 0.3-0.4 μm, 0.4-0.5 μm, 0.5-0.6 μm, 0.6-0.7 μm, 0.7-0.8 μm, 0.9-1 μm, 1-10 μm, 10-100 μm. One of ordinary skill in the art could select the appropriate pore size based on the intended use and overall design of the microfluidic device into which the filter will be incorporated. In one example embodiment, the sheath material is PVDF. In another example embodiment, the sheath material is PTFE.

In certain example embodiments, the filter unit has the design shown in FIG. 5, wherein the sheath material 120 is sized to properly fill the space between the core material and the supporting substrate of the microfluidic device in which the filter sits. As one of ordinary skill in the art will recognize, the aperture 115 and internal compartment 110 are not required when operating the microfluidic device component as a filter.

In certain other example embodiments, the filter function may be performed by a pore membrane that is held in place between the sheath material and the core material. In such an embodiment, one of ordinary skill in the art will recognize that the sheath material need not be porous, and therefore may include any of the non-porous sheath materials described above. The pore membrane material may be any pore membrane material known in the art and sized to fit within the filter designs disclosed herein. One of ordinary skill in the art will be able to select an appropriate pore membrane based on the intended use of the microfluidic device.

Figure 11:
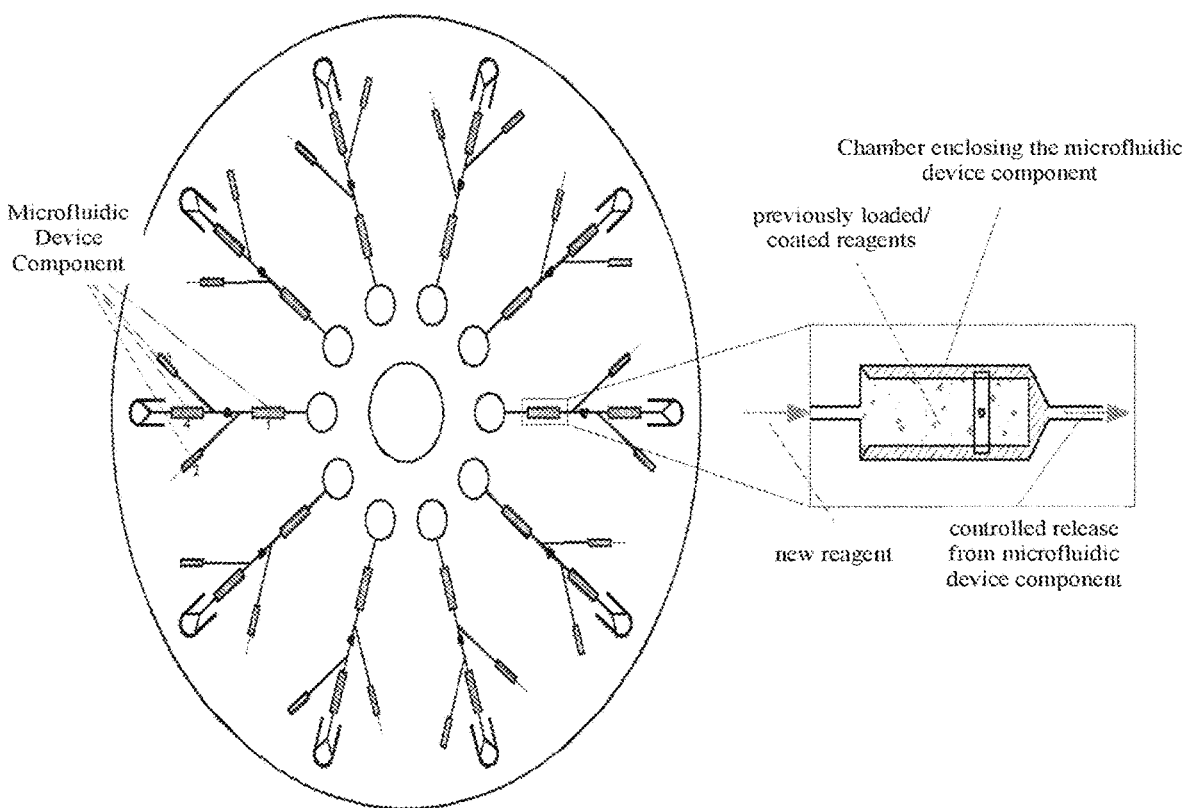
FIG. 11 provide a schematic of an example centrifugal microfluidic device comprising multiple example microfluidic device components.

Microfluidic device incorporating the microfluidic device components disclosed herein may use multiple components in combination to achieve storing, mixing, filtering of contents as needed and depending the use or assay to be conducted on the microfluidic device. The combination of multiple microfluidic device components may define a reaction module. Accordingly multiple reaction modules may be array in a multiplex format to allow for multiple assays to be carried out in parallel. For example, in a diagnostic context, multiple reaction modules may be used to screen multiple samples in parallel, or run multiple diagnostics on a single sample at the same time. FIG. 11 provides an example layout of multiple microfluidic device containing multiple reaction modules. Chambers, as shown in FIG. 11 may be defined on the microfluidic device to receive the microfluidic device components and connect them to additional inlets, outlets, and channels as needed to move contents through the reaction modules on the device. In certain example embodiments, the microfluidic device component may be sealed within the chamber by a medical adhesive, such as a one-side medical adhesive.

It should be noted that all of the above microfluidic device components may be further modified to connect to an inlet channel on a microfluidic device so that solutions flow into the microfluidic device component via the inlet and then are released/pumped/filtered out of the aperture in the microfluidic device component.

Methods of Use

In another aspect disclosed herein, a method for the sequential proportional release of reagents on a microfluidic device. The method comprises providing a microfluidic device comprising one or more storage containers as disclosed herein. Microfluidic devices may be manufactured using known methods in the art. The storage compartments are integrated into the microfluidic device at the appropriate points where on-board storage and proportional release of reagents is required. For example, the storage compartments may be placed on the microfluidic device in fluid communication with one or more compartments or flow channels into which the reagents stored in the storage compartment are to be released. The on-board storage of the reagents eliminates the need to pipette the reagents onto the device, making the device more portable as it is no longer required to be tethered to such pipetting mechanisms. The reagents stored in the storage compartment are then released by application of a pressure sufficient to deform the elastic sheath material and unseal the one or more apertures in the core material. The storage container(s) is then re-sealed by releasing the pressure and allowing the elastic sheath material to once again seal the surface of the core material. The operational speeds in case of the centrifugal microfluidics will vary depending on the elastic moduli of the sheath material and the dimension and the number of the apertures and its position and/or location on the centrifugal microfluidic platform. An example rotational speed for centrifugal microfluidic devices is be between 200 rpm to 8000 rpm.

It should be understood, the embodiments disclosed herein further comprise methods for filtering and moving solutions through microfluidic devices comprising incorporating and actuating the filter, valve, and pump devices described herein either alone or in conjunction with one another and the storage containers described herein. The various microfluidic device component described herein may be incorporating into various microfluidic device designs. The microfluidic device may be a linear microfluidic device—i.e. operated by the application of pressure or other actuator force to components of the microfluidic device, or a centrifugal microfluidic device.

In example embodiment, the devices described herein may be used for separation of plasma from blood. Whole blood may be loaded into the container and then sealed for a time sufficient to allow the plasma to separate from the red and white blood cells. Alternatively, centrifugation may used to force the red and white blood cells to a portion of the container opposite the apertures. The separate plasma layer may the be pumped or pushed out of the container.

The microfluidic device components described herein may also be used in pharmacy-on-a-chip devices capable of delivering drugs, including implantable devices. The microfluidic device components may also be used in lab-on-a-chip devices to run diagnostics including applications for running of diagnostics at point of care (POC).

REFERENCES CITED

1. P. Yager, T. Edwards, E. Fu, K. Helton, K. Nelson, M. R. Tam and B. H. Weigl, *Nature,* 2006, 442, 412-418.
2. A. Kazemzadeh, P. Ganesan, F. Ibrahim, L. Kulinsky and M. J. Madou, *RSC Advances,* 2015, 5, 8669-8679.
3. M. M. Aeinehvand, F. Ibrahim, S. Wadi Harun, A. Kazemzadeh, H. A. Rothan, R. Yusof and M. J. Madou, *Lab Chip,* 2015, DOI: 10.1039/C5LC00634A.
4. A. Kazemzadeh, P. Ganesan, F. Ibrahim, M. M. Aeinehvand, L. Kulinsky and M. J. Madou, *Sens. Actuators, B,* 2014, 204, 149-158.
5. O. Strohmeier, M. Keller, F. Schwemmer, S. Zehnle, D. Mark, F. von Stetten, R. Zengerle and N. Paust, *Chemical Society Reviews,* 2015, 44, 6187-6229.
6. S. Haeberle, D. Mark, F. von Stetten and R. Zengerle, in *Microsystems and Nanotechnology,* eds. Z. Zhou, Z. Wang and L. Lin, Springer Berlin Heidelberg, 2012, DOI: 10.1007/978-3-642-18293-8_22, ch. 22, pp. 853-895.
7. L. Clime, D. Brassard, M. Geissler and T. Veres, *Lab Chip,* 2015, DOI: 10.1039/C4LC01490A.
8. M. Hitzbleck and E. Delamarche, *Chemical Society Reviews,* 2013, 42, 8494-8516.
9. M. Rombach, S. Lutzl, D. Markl, G. Roth, R. Zengerlel, C. Dumschat, A. Witt, S. Hensel, S. Frenzel, F. Aßmann, F. Gehring, T. Reiner, H. Drechsel, P. Szallies and F. v. Stetten, Okinawa, Japan, 2012.
10. T. Kawai, N. Naruishi, H. Nagai, Y. Tanaka, Y. Hagihara and Y. Yoshida, *Anal. Chem.,* 2013, 85, 6587-6592.
11. T.-H. Kim, K. Abi-Samra, V. Sunkara, D.-K. Park, M. Amasia, N. Kim, J. Kim, H. Kim, M. Madou and Y.-K. Cho, *Lab Chip,* 2013, 13, 3747-3754.
12. K. Abi-Samra, R. Hanson, M. Madou and R. I. Gorkin, Lab Chip, 2011, 11, 723-726.
13. H. Hwang, Y. Kim, J. Cho, J.-y. Lee, M.-S. Choi and Y.-K. Cho, *Anal. Chem.,* 2013, 85, 2954-2960.
14. J. Hoffmann, D. Mark, S. Lutz, R. Zengerle and F. von Stetten, *Lab Chip,* 2010, 10, 1480-1484.
15. T. van Oordt, Y. Barb, J. Smetana, R. Zengerle and F. von Stetten, *Lab on a Chip,* 2013, 13, 2888-2892.

What is claimed is:

1. A device component, consisting of:
one or more layers of an elastic sheath and/or flexible sheath material;
a core material with one or more internal compartments and one or more apertures in a side wall of the core material that connects the internal compartment to an outer surface of the core material and that is press fit within the one or more layers of an elastic sheath and/or flexible sheath material, wherein the elastic sheath and/or flexible sheath-material is configured to deform at the one or more apertures and unseal the one or more apertures upon application of an external force to the elastic sheath and/or flexible sheath material, and to recover and reseal the one or more apertures upon removal of the external force; and wherein the one or more internal compartments is configured to proportionally release reagents stored in the one or more internal compartments via the one or more apertures when unsealed.

2. The device component of claim 1, wherein the outer surface of the core material is grooved, physically and/or chemically modified, has one or more indentations, wherein the core material is insulated, or a combination thereof.

3. The device component of claim 1, wherein the core material is shaped as a cylinder, cube, cuboid, polyhedral, disc, capsule or sphere, or the core material is opaque, translucent, transparent, or comprises different portions that are individually opaque, translucent, or transparent.

4. The device component of claim 1, wherein the one or more internal compartments has a volume of approximately 5 microliters to approximately 10 milliliters.

5. The device component of claim 4, wherein the core material comprises two or more of the internal compartments and wherein each internal compartment is the same size or a different size, wherein the outer surface of the core material is grooved or comprises one or more indentations, physically and/or chemically modified, wherein the core material is insulated, or a combination thereof.

6. The device component of claim 1, wherein the elastic sheath and/or flexible sheath material comprises latex, synthetic rubber, silicone rubber, thermoplastic elastomers, natural rubber, nitrile rubber, sponge rubbers, foam rubbers, a bio-compatible material selected from polyetheretherketone (PEEK), poly (ethylamine) (PEI), polyethersulfone (PES), poly (glycolic acid) PGA, poly (L-lactic acid) (PLLA) and copolymers thereof, or polymeric material, or has a thickness of approximately 0.1 mm to approximately 10 mm.

7. A device comprising the device component of claim 1 connected to an actuator to apply pressure to the core material.

8. The device of claim 7, wherein the device is a centrifugal device, the external force is a centrifugal force, and the device is actuated by application of the centrifugal force to the device component.

9. The device of claim 7, wherein the elastic sheath and/or flexible sheath comprises a spongy or permeable elastic material configured to cause the device to function as a spray valve and/or wherein the core material comprises a hollow or semi-hollow material.

10. The device of claim 9, wherein the device is connected to the actuator, or wherein the device component is a centrifugal device, the external force is a centrifugal force, and/or the device is actuated by application of the centrifugal force to the device.

11. The device of claim 7, wherein the device is configured to function as a pump, wherein the elastic sheath and/or flexible sheath material comprises an elastic material having a Young's modulus in a range of between 10 MPa and 1 GPa, or the one or more compartments are fully or partially filled with liquid.

12. The device of claim 11, wherein the device is connected to the actuator or the device component is a centrifugal device, the external force is a centrifugal force, and the device is actuated by application of the centrifugal force to the device.

13. A device storage container, comprising:
    the device component of claim 1, and wherein the one or more internal compartments each has a volume of approximately 1 nL to approximately 10 mL.

14. A device comprising one or more of the storage containers as defined in claim 13.

15. The device of claim 14, wherein the one or more storage containers are connected to an actuator, wherein application of the external force to the core material deforms the elastic sheath and/or flexible sheath material allowing release of the reagents stored in the one or more compartments via the one or more apertures in the core material or a centrifugal microfluidic device, wherein application of a centrifugal force as the external force to the core material inflates the elastic sheath and/or flexible sheath material allowing release of materials stored in the one or more compartments via the one or more apertures in the core material.

16. A method for storing and releasing reagents on devices, comprising:
    providing a device comprising one or more of the storage containers as defined in claim 13, the storage containers comprising the reagents to be stored and released during operation of the device;
    releasing at least a portion of the reagents stored in the one or more storage containers by applying the external force to the core material in the form of a pressure to unseal the one or more apertures in the core material by actuating a separation of the elastic sheath and/or flexible sheath material from the core material; and
    resealing the one or more storage containers by releasing the pressure applied to the core material thereby allowing the elastic sheath and/or flexible sheath material to seal the one or more apertures in the core material.

17. A device filter comprising:
    the device component of claim 1, wherein the one or more layers of the elastic sheath and/or flexible sheath material is porous, with a pore size of between 0.01 μm to 100 μm, and wherein the one or more layers of the elastic sheath and/or flexible sheath material is latex, synthetic rubber, and/or thermoplastic elastomers.

18. A device comprising one or more filters according to claim 17.

19. A device filter comprising:
    one or more layers of an elastic sheath and/or flexible sheath material;
    a core material with two or more internal compartments, each compartment separated by a porous filter material, and one or more apertures in a side wall of the core material that connects at least one of the internal compartments to an outer surface of the core material, the core material press fit within the one or more layers of an elastic sheath and/or flexible sheath material.

20. The device filter of claim 19, wherein the two or more internal compartments comprise three or more internal compartments, wherein the porous filter material separating each internal compartment has a different pore size or is a different porous filter material.

21. A device comprising one or more device filters according to claim 19 and wherein the device is a centrifugal device.

22. A method for separating plasma from blood comprising:
    introducing whole blood into the device component of claim 1;
    sealing the device component for a time sufficient to allow plasma to separate from red and white blood cells, or sealing the device component and applying a centrifugal force to separate the plasma from the red or white blood cells; and optionally pumping or pushing the separated plasma and/or white cells, and/or buffy coat out of the one or more apertures of the device component.

23. A method for separating plasma from blood comprising:

introducing whole blood into the device component of claim 4;

sealing the device component for a time sufficient to allow plasma to separate from red and white blood cells, or sealing the device component and applying a centrifugal force to separate the plasma from the red or white blood cells; and optionally pumping or pushing the separated plasma and/or white cells, and/or buffy coat out the one or more apertures of the device component.

\*    \*    \*    \*    \*